Feb. 18, 1958  J. PASQUALI  2,823,929

TRUCK STEERING HITCH

Filed May 24, 1955

United States Patent Office 2,823,929
Patented Feb. 18, 1958

2,823,929

TRUCK STEERING HITCH

Jean Pasquali, Paris, France, assignor to Societe a Responsabilite Limitee dite: M. I. C. (Mecanique, Industrie, Chimie), Paris, France Application May 24, 1955, Serial No. 510,712

Claims priority, application France May 31, 1954

3 Claims. (Cl. 280—444)

The invention relates to freight or like trucks and more particularly to a truck adapted to be pushed or drawn in one or the other direction and so designed that when it is coupled to other similar trucks it will pass very substantially on the wheel tracks of the preceding truck, even in case of frequent and sharp changes in direction, or when the trucks effect turns having a very small radius of curvature.

To this end, the truck according to this invention comprises, as already known per se, a train of two intermediate wheels having a fixed common axis located in the transverse plane of symmetry of the truck, and a pair of swivelling wheels, preferably of the offset pivoting strip type, each swivelling wheel being disposed symmetrically on either side of the aforesaid transverse plane of symmetry and in the longitudinal plane of symmetry of the truck, in combination with at the front an axial pivoting coupler rod adapted to be connected to the rear end of the trailer or preceding truck, and at the rear a device positioned on the longitudinal axis of the truck for attaching the front end of the coupler rod of the following truck so as to permit the pivotal movement of this rod, and finally a kinematic linkage between the swivelling wheel adjacent to said coupler rod and the coupler rod proper, such that the axis of said last-mentioned wheel will constantly pass substantially through the intersection of the plane at right angles to the coupler rod passing through the centre of this rod and the transverse plane of symmetry of the truck.

This kinematic linkage may consist of a guide bar having one end attached to and rotatably rigid with the strap carrying the aforesaid swivelling wheel, and the other end mounted on, and guided by, said coupler rod through the medium of a slide.

The position of this slide relative to the coupler rod and the guide bar, whereby the relevant swivelling wheel will be steered according to the angular position of the coupler rod with respect to the longitudinal axis of the truck, may be readily calculated by means of a single geometrical construction.

Now it has been found that by securing the slide to the guide bar so that the distance between this slide and the vertical axis about which the swivelling wheel is mounted be constant, or by so fixing this slide on the coupler rod that the distance from the slide to the point of attachment of the coupler rod to the truck be constant, the orientation of this swivelling wheel while being adequate for a given angular setting of said coupler rod will remain substantially adequate for any other orientation of this coupler rod.

Therefore, either of these solutions or any other intermediate solutions may be applied in the practice.

Preferably, the guide bar is of the collapsible type, one or the other end thereof being releasable so as to avoid interfering with the free swivelling movement of the corresponding pivoting wheel when the truck is not coupled.

The attached drawing forming part of this specification illustrates diagrammatically by way of example one form of embodiment of this invention. In the drawing.

Figure 1:
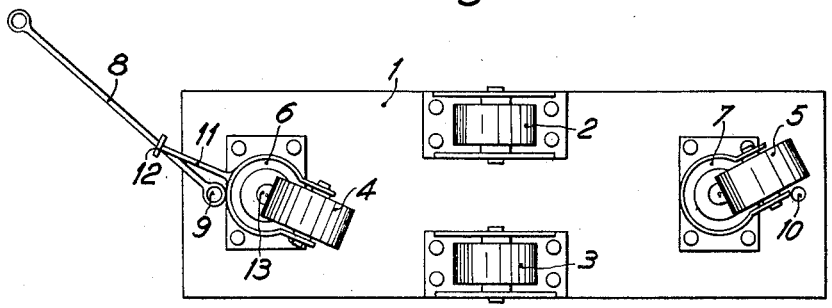
Figure 1 is a plan view from below showing a truck constructed in accordance with the teachings of this invention.

The truck illustrated in the drawing comprises beneath its platform 1 a pair of wheels 2, 3 having a common fixed axis coincident with the transverse plane of symmetry of the truck; another pair of wheels 4, 5 are carried by offset straps 6, 7 adapted to swivel about vertical axes located on the longitudinal plane of symmetry of the truck.

With this known arrangement the truck may be pushed or propelled in either direction and its front and rear swivelling wheels will take automatically the desired orientation so as to follow the selected path, the offset pivoting strap facilitating this orientation or proper angular setting of the steering wheels which is such that the axes of the wheels 4, 5 must constantly intersect each other on the axis of the intermediate wheels 2, 3 at the momentary centre of curvature I of the path followed by the truck.

The truck according to this invention also comprises a coupler rod 8 pivotally mounted on a vertical pin 9 and a device 10 adapted to be pivotally connected to the outer end of the coupler rod of another similar truck; the swivelling strap 6 is rotatably rigid with a guide bar 11 carrying at its outer end a slide 12 consisting in the example illustrated of a fork adapted to receive the coupler rod between its arms.

When the truck is pushed in one or the other direction the coupler rod 8 and guide bar 11 are disconnected from each other to enable the swivelling wheels 4, 5 to take automatically the orientation corresponding to the direction in which the truck is to be propelled; preferably, the coupler rod 8 and guide bar 11 are collapsible to avoid interfering with the truck operation at the uncoupled end thereof.

Figure 2:
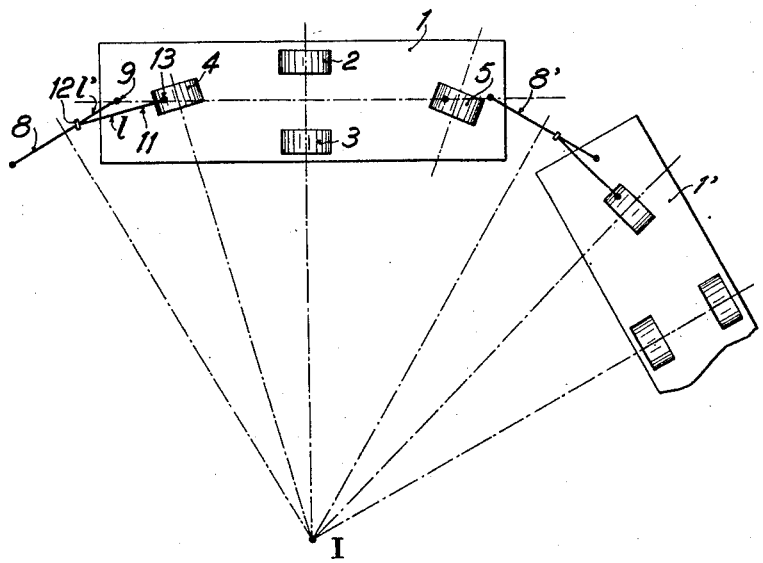
Figure 2 is an explanatory diagram.

The steering diagram of Fig. 2 shows the momentary centre of curvature I of the truck when the latter is driven along a curve. This centre I is located at the intersection of the plane passing through the centre of, and normally to, the coupler rod 8, with the axis of rotation of the wheel 4 adjacent to this coupler rod, and also with the transverse plane of symmetry of the truck 1 which is coincident with the common axis of the intermediate wheels 2, 3; with this diagram it is possible to determine the length $l$ of the guide bar, i. e. the distance between the slide 12 and the swivel axis 13 of the offset swivelling strap carrying the corresponding wheel 4, on the one hand, and the distance $l'$ between this slide 12 and the axis of rotation 9 of the coupler rod 8.

When these distances have been determined, according to the form of embodiment illustrated in Fig. 1, the length $l$ between the slide 12 and its centre of pivoting 13 is determined and to this end the slide 12 may be secured to the outer end of the guide bar 11. According to an alternate embodiment, the fixed length may be the distance $l'$ between the slide 12 and the centre of pivoting 9 of the coupler rod 8; in this case the slide 12 is secured on the coupler rod 8 and adapted to slide along the guide bar 11.

In fact, experience teaches that with either of these solutions almost perfect results may be achieved, and when a plurality of similar trucks are coupled together each truck will pass very substantially on the tracks of the preceding truck, irrespective of the angle of steering.

Obviously, the intermediate wheels 2, 3 prevent the side-skidding of the truck and the rear wheel 5 will be steered automatically in the direction adapted to cause its axis to intersect the momentary centre I; due to the symmetrical design of the assembly, the line drawn at right angles to the coupler rod 8' of the following truck 1' will also pass substantially through the momentary centre of rotation I, and consequently the axes of the different wheels of this following truck will also pass through this centre I.

Although from the purely geometrical standpoint this solution is only approximate, practical embodiments thereof have given very satisfactory results and shown substantial improvements over those obtained up to now with trucks designed to be coupled by two, three or more to form trains of trucks for transporting freight or luggages.

Of course, the form of embodiment described and shown herein is given by way of example only and many modifications may be brought thereto without departing from the spirit and scope of the invention. Thus, notably, the rear wheel may be dispensed with if desired, and on the other hand one or the other of the swivelling wheels of the arrangement may be replaced by a train of swivelling wheels.

What I claim is:

1. A freight truck adapted to form with other like trucks a train of trucks such that all the truck wheels will pass substantially along the same path, which comprises a truck body, a pair of coupling pins carried by said body with one of said pins positioned at the front portion of said body and the other at the rear portion of said body, said two pins being disposed symmetrically with respect to the transverse plane of symmetry of said body, a rigid axial coupler rod pivotally connected to the front coupling pin and adapted to connect the front coupling pin to the rear coupling pin of the preceding like truck, a pair of axially spaced-apart intermediate wheels having a fixed common axis located in the transverse plane of symmetry of the body between said coupling pins, front swivelling wheel means and rear swivelling wheel means, said front swivelling wheel means having a vertical axis disposed between said front pin and said intermediate wheels and said rear swivelling means having a vertical axis disposed between said rear pin and said intermediate wheels with said pins and said vertical axes lying in a common vertical plane, and a guide bar fixed at one end to said front wheel means and slidably engageable with said coupler rod at its other end and adapted to cause the steering of said front swivelling wheel means to be controlled by the angular position of the coupler rod, whereby the axis of said front swivelling wheel means will constantly pass substantially through the intersection of the plane normal to and intermediate said coupler rod with the transverse plane symmetry of the body between said coupling pins.

2. A freight truck according to claim 1, wherein said front swivelling wheel means is mounted in an offset pivoting strap.

3. A freight truck according to claim 1, wherein one end of said guide bar is rotatably rigid with said front swivelling wheel means, and said truck further comprising a slide adapted to guide the other end of said guide bar along said coupler rod.

References Cited in the file of this patent
UNITED STATES PATENTS

| 967,647 | Lind | Aug. 16, 1910 |
| 1,209,408 | Dorsey | Dec. 19, 1916 |

FOREIGN PATENTS

| 340,143 | France | May 4, 1904 |
| 536,085 | France | Feb. 6, 1922 |